(12) United States Patent
Tafas

(10) Patent No.: US 7,589,309 B2
(45) Date of Patent: Sep. 15, 2009

(54) IMAGER SYSTEM FOR AN AUTOMATED MICROSCOPE

(75) Inventor: Triantafyllos Tafas, Rocky Hill, CT (US)

(73) Assignee: Ikonisys, Inc., New Haven, CT (US)

( * ) Notice: Subject to any disclaimer, the term of this patent is extended or adjusted under 35 U.S.C. 154(b) by 0 days.

(21) Appl. No.: 11/689,948

(22) Filed: Mar. 22, 2007

(65) Prior Publication Data
US 2007/0222880 A1 Sep. 27, 2007

Related U.S. Application Data

(60) Provisional application No. 60/743,660, filed on Mar. 22, 2006.

(51) Int. Cl.
*H01J 31/50* (2006.01)
*H01L 27/00* (2006.01)
*H03G 3/20* (2006.01)

(52) U.S. Cl. ............... 250/214 VT; 250/208.1; 250/214 AG

(58) Field of Classification Search ............... 250/208.1, 250/214 VT, 201.2, 201.3, 207, 205, 216, 250/214 AG; 313/103 R, 103 CM; 348/308
See application file for complete search history.

(56) References Cited

U.S. PATENT DOCUMENTS

| 6,150,652 A * | 11/2000 | Forsyth ............... 250/214 VT |
| 6,636,701 B1 | 10/2003 | Vezard et al. |
| 6,650,357 B1 | 11/2003 | Richardson |
| 6,657,385 B2 * | 12/2003 | Tomasetti et al. ........... 313/527 |
| 6,970,190 B2 * | 11/2005 | Ostromek et al. ........ 348/217.1 |

* cited by examiner

*Primary Examiner*—Que T Le
*Assistant Examiner*—Pascal M Bui-Pho
(74) *Attorney, Agent, or Firm*—Kelley Drye & Warren LLP

(57) ABSTRACT

An imager system is disclosed comprising a image intensifier and a CMOS image sensor. The system provides fast capture speed and high sensitivity.

8 Claims, 4 Drawing Sheets

IMAGER SYSTEM FOR AN AUTOMATED MICROSCOPE

CROSS-REFERENCE TO RELATED APPLICATION

This application claims benefit under 35 U.S.C. §119(e) from U.S. Provisional Application Ser. No. 60/743,660, filed Mar. 22, 2006.

FIELD OF INVENTION

In embodiments there is disclosed an imager system employing an image intensifier.

BACKGROUND

Conventional analysis of small samples may entail laborious and time-consuming analysis under a microscope. More efficient analysis of samples may be performed using automated microscopy technology.

For example, common testing protocol is FISH. Typically FISH analysis is done by manual inspection of tissue samples by a skilled microscopist. In addition to correctly identifying the dot and its color, other size and shape characteristics must be categorized to correctly identify the condition. The analysis is made more difficult by the time constraints imposed by the phenomena. The microscopist, therefore, must be exhaustively trained to perform the examination. Even under the best conditions, the process has been proven to be tedious, lengthily and subject to human error.

The application of automated microscopy has the potential to overcome many of the shortcomings of the manual approach. The automatic microscope can reliably identify the fluorescent dots in a tissue sample, accurately determine their color, categorize them based on shape and size, and perform the summary analysis necessary to determine the presence or absence of the targeted condition without the inevitable subjective factors introduced by a human operator all in a timely manner.

Some widely-used Down syndrome test employ FISH analysis. For example, the AneuVysion test uses colored DNA probes that attach to specific chromosomes in the amniotic fluid cells. Unlike karyotyping, this test doesn't require growth of the cells in a laboratory incubator. Thus, cells can be analyzed within hours after the DNA probes are added. After the DNA probes are mixed with the cells, they attach to specific chromosomes. Different probes carry different colored fluorophores to allow for differentiation. For example, when a probe finds chromosome 21, it attaches in a very specific spot, and, for example, an orange-colored signal within the fetal cell is visible through the microscope. A laboratory technologist then must manually count the number of colored spots in each cell and determine if there are the two number 21 chromosomes as expected or if there are three 21 chromosomes indicating Down syndrome. The same procedure may be performed simultaneously for chromosomes 13, 18, X and Y with each chromosome appearing as a different colored spot. Thus if three spots for chromosome 13 or 18 are observed, then the fetus has trisomy 13 or trisomy 18. Turner or Klinefelter syndromes are detected by the probes for the X and Y chromosomes.

In the case of FISH analysis, the viewer must be able to discriminate and quantify the various emanations coming from the fluorphores. The difficulty in doing this may be said to be greatly increased when an automated microscope is utilized. An automated microscope must be capable of quantifying dim emanations of various wavelength fluorescent light from linked dye markers associated with tissue sample. When extremely rare cells are being analyzed, such as, for example without limitation, when fetal cells are being analyzed, there needs to be the ability for the microscope to detect signals from among large quantities of cells etc.

When rare cells or elements are to be detected, there may be the need to examine many slides to make a diagnosis or determination pertaining to the subject, material etc. from which the analyzed samples were taken. For example with respect to rare cells such as fetal cells in a maternal blood sample, this may require the examination of over 200 slides for appropriate determination. The sample on each of these slides, may in turn, cover an area corresponding to a large number of microscopic fields of view. Thus many microscopic fields of view may be needed to be examined to perform a single analysis. Of course, it would be desirable to provide a single image capture time as low as possible, for example, in some cases of approximately 5 milliseconds or less.

In FISH analysis, examination may be made more difficult by a low level of emitted fluorescent light that may be produced, low half life and a relatively short emission period. A further challenge that may be faced is that the markers may fluoresce at differing wavelengths which serve as identification parameters.

The practical implementation of an automated microscope suitable for the detection of rare components in a sample, such as rare cells in a tissue sample, may require image capture technology that satisfies several diverse requirements, for example, include high sensitivity, fast capture speed, high frame rate, and superior wavelength resolution.

SUMMARY OF INVENTION

Figure 1:
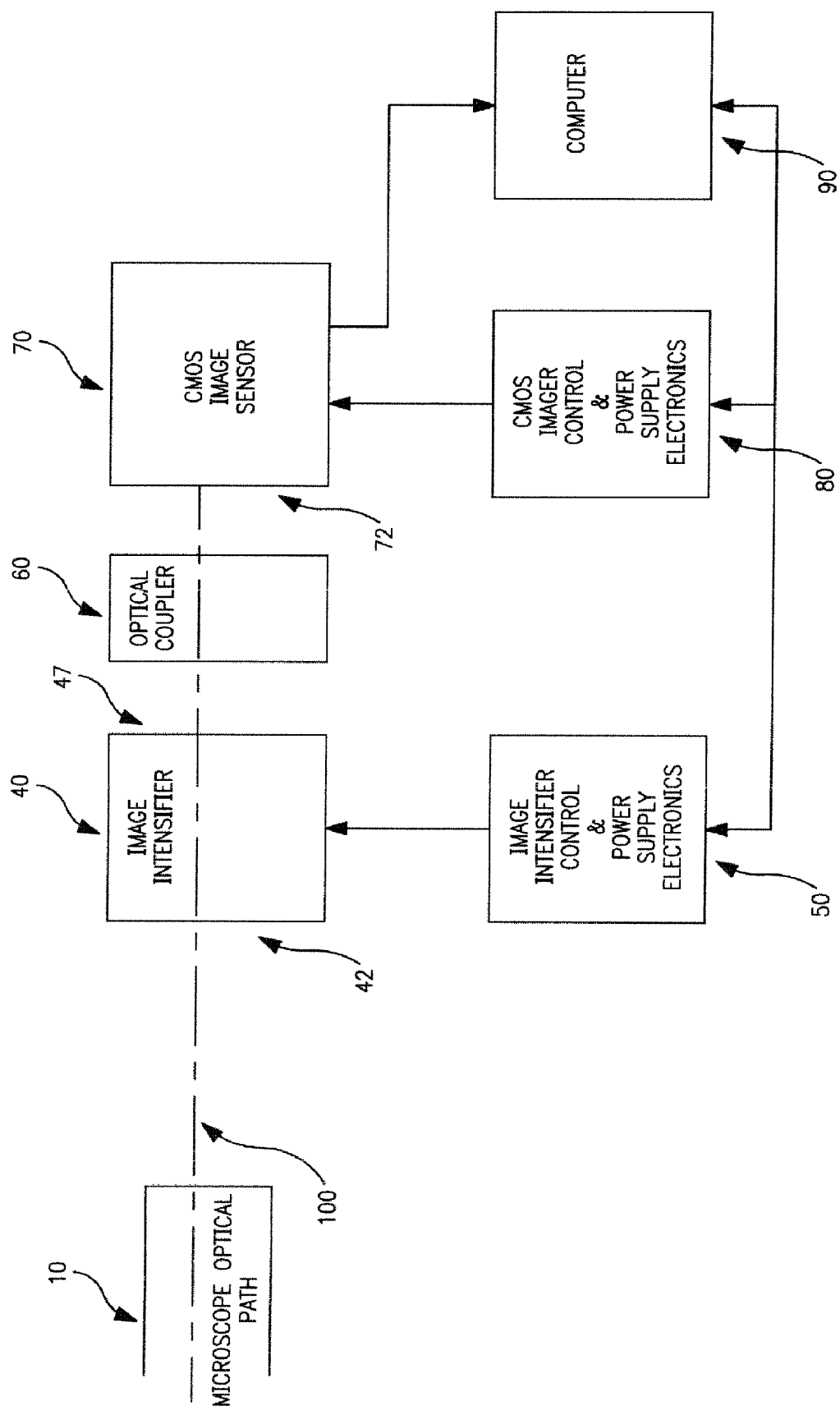
FIG. 1 is a simplified schematic diagram of the biomedical imager system.

An automated microscope may utilize an electronic sensor located at the output of the optical path to capture the image. Technologies that are presently practical as electronic image sensors include: the charge coupled device (CCD) and the complementary metal oxide semiconductor (CMOS). CCD technology is characterized by high sensitivity but speed which may be found inadequate for the requirements of the FISH automated microscope. CMOS technology, on the other hand, has adequate speed but the sensitivity may not be found to be sufficient for this application.

It is proposed in an embodiment herein that both the capture speed and sensitivity requirements for automated microscopy designed to detect items in a sample make use of an image intensifier technology with a CMOS image sensor device. In such embodiment, an image intensifier may be used to amplify the emitted light level to that adequate for the CMOS device which captures the image at high speed. In one possible option first generation image intensifier is used, which comprises a vacuum structure comprising of an input photo-cathode which converts an input image, consisting of photons, into an equivalent electronic image, consisting of electrons. The electrons are accelerated within the vacuum structure toward an anode where they impact a phosphorous output screen and are converted back to photons. Later generation image intensifier structures may also be employed which incorporate a "honeycomb-like" electron multiplier structure. With this structure, electrons on their way to the output screen collide with the structure walls thereby releasing additional electrons. The now multiplied electron "image" continues to the output screen and impacts, releasing more photons for a brighter image than that possible with first generation technology.

In such embodiment, the image intensifier output screen, depending on the characteristics of the phosphor compound selected, has a response time and an output emission wavelength. By proper selection of the phosphor compound the system may be designed to have a sufficiently fast response time to implement sufficiently high speed capture of images for the application. With conventional image intensifier technology, as discussed above, the output emission wavelength is independent of the wavelength(s) of the original image. It is determined only by the characteristics of the phosphor. One method of providing wavelength discrimination for an image intensifier is to employ optical band-pass filtering of the image before its input to the photo-cathode. By capturing multiple images, in time succession, through a set of orthogonal optical band-pass filters, and computationally combining the multiple images, a true color electronic representation of the microscope view may be created.

The implementation of an image intensifier/CMOS imaging system must also provide adequate dynamic range. The image intensifier and CMOS components have individual dynamic range limitations which must be addressed. For the case of the image intensifier, overload amelioration is a important consideration. Excessive light levels applied to the photo-cathode can result in performance degradation or, in extreme cases, physical damage to the elements of the intensifier. A practical design must include an automatic provision to adjust to high light levels so as to prevent damage. Both the intensity of the overall image, as well as "hot-spots" within the image, must be addressed.

In embodiments there is disclosed:

An imager system comprising: an image intensifier including an entrance window and an exit window, a photo-cathode, a dynode, an anode, a phosphor screen; a image intensifier control and power supply unit operationally configured to allow control and powering of the image intensifier, the image intensifier control and power supply unit operationally connected to the image intensifier; a CMOS image sensor having an input window; an optical coupler having an input window and an output window, the input window of the optical coupler directly connected to the exit window of the image intensifier, the output window of the optical coupler directly connected to input window of the CMOS image sensor; a processor connected to the CMOS image sensor, the processor operationally configured to interrogate and process data from the CMOS sensor; the process further connected to the image intensifier control and power supply unit and operatively configured to generate gain control and photo-cathode gating command signals; wherein the gain control and the cathode gating command signals are applied to the image intensifier control and power supply unit to effect overload control of the image intensifier.

An embodiment further comprises a phosphor screen of the image intensifier employing P-43 phosphor. In an additional embodiment the imager includes optical bandpass filtering prior to the image intensifier. In a configuration, the bandpass filtering comprises a plurality of input optical bandpass filters; the plurality of input optical bandpass filters is installed on motorized turn table operatively configured to sequentially insert the optical bandpass filters into optical path; the motorized turn table including position control means. The selection of filters may, in addition include all-pass and opaque filters.

DETAILED DESCRIPTION OF EMBODIMENTS

An embodiment of the biomedical imager suitable for an automated microscope is presented as a simplified schematic in FIG. 1. The optical image 100 formed by the microscope's optical system is applied to the input window 42 of the image intensifier 40 where it is amplified. The image intensifier 40 obtains all required voltages and control signals from the image intensifier control and power supply electronics unit 50. The intensified optical image is output from the phosphor screen exit window 47. A passive optical coupler 60 transfers the image from the exit window 47 to the input window 72 of the CMOS image sensor 70. The CMOS image sensor 70 includes the necessary interface electronics and obtains all of the required voltages and control signals from the CMOS imager control and power supply electronics unit 80. The CMOS image sensor 70 comprises an array of picture elements, or pixels, each of which converts the applied optical photons to a proportional electrical charge. Each of the pixel's charges are read by an electronic scanning circuit and transferred to processing device, such as a computer 90. The computer 90 computationally processes the data and, in part, extracts the desired analytic result.

Figure 2:
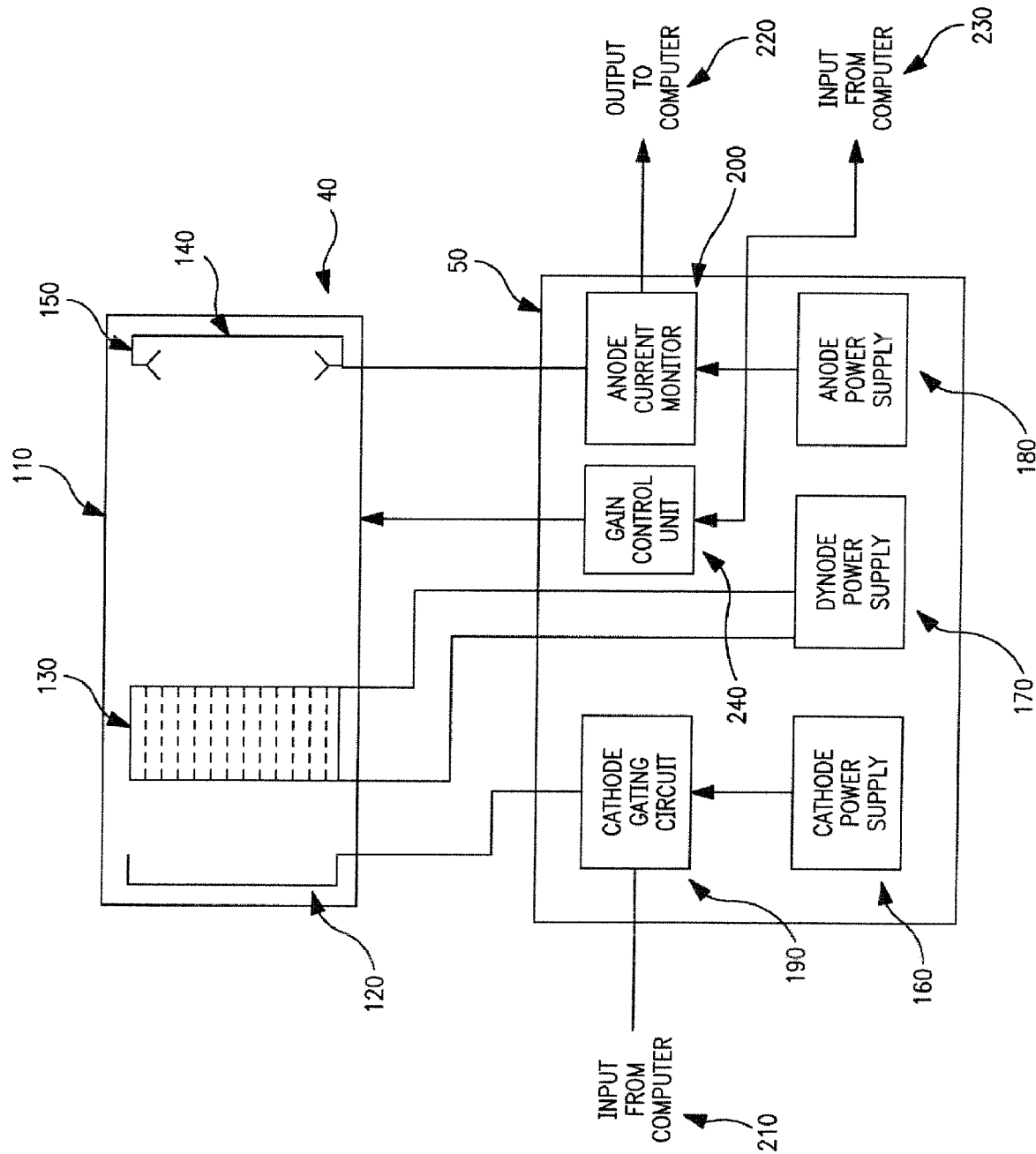
FIG. 2 is a simplified schematic diagram of the image intensifier and its associated electronics support unit.

Referring to FIG. 2, a more detailed functional schematic diagram of the image intensifier 40 and its associated control and power supply electronics unit 50 is presented. The image intensifier 40 consists of a vacuum enclosure 110 containing the electronic structure. The optical input image is applied to the photo-cathode 120. For every photon impacting the photo-cathode 120 an electron is emitted and travels in the direction of the anode 150 under the influence of the D.C. potential applied to the anode 150 by the anode power supply 180 included within the control and power supply electronics unit 50. The electrons emitted from the photo-cathode 120 impinge on the microchannel plate, having a "honey-comb" like structure serving as the dynode 130. The appropriate potential is applied to the dynode 130 by the dynode power supply included within the control and power supply electronics unit 50. Electronics unit 50 may comprise software, hardware, or a combination thereof. Each of the impinging electrons causes the secondary emission of additional electrons which also propagate toward the anode 150. The electrons are accelerated by the anode potential and collide with the phosphor screen 140. Each collision results in the emission of a photon. As previously described, the time response of the phosphor utilized is a factor determining the overall capture speed of the system. In an application wherein about more than 200 images may be needed to be taken per second, a P43 phosphor is an example of an acceptable material. The newly generated photons exit the image intensifier 40.

The photons are directly applied to the input window of the optical coupler 60. The optical coupler 60 transports the photons from the image intensifier exit window 47 to the entrance window 72 of the CMOS image sensor 70. The optical coupler 60 may be made up of an bundle of fiber optic fibers forming a frusto-conical taper. This configuration permits the image size exiting from the image intensifier 40 to be magnified (or reduced) to match the entry window 72 of the CMOS image sensor 70.

The image sensor 70 is comprised of a planar array of pixels. As an example, a sensor suitable for this application may have four million individual pixels. In operation, each pixel accumulates a charge in direct proportion the intensity of light falling on that pixel. When an image is to be captured, each pixel is measured and the value is converted to a digital word by means of an analog to digital converter. Each of the digitized values is stored in the memory of the computer 90.

As was described, the image intensifier 40 may be over driven by excessive image light intensity. Two separate image light intensity characteristics may be considered in the design. The first being the integrated light intensity of the total image and the second being "hot-spots" occurring at localized areas within the total image. A measure of the total image intensity is the anode current being drawn by the image intensifier. This current may readily be monitored by an anode current monitor 200, located at the anode power supply 180. As an example, the anode current may be determined by measuring the voltage drop across a series resistor located in the anode power supply lead. The measured current value 220 may be sent to the computer 90. The computer 90, in accordance with a stored algorithm, for example, may be configured to determine whether the current is excessive. If it is, the cathode gating circuit 190 is commanded 210 by the computer 90 to periodically turn the photo-cathode off and on at a rapid rate. The duty cycle of the photo-cathode is thereby reduced and the total flow of electrons is proportionally decreased. The second portion of the overload system manages "hot-spots." The CMOS sensor's measured pixel charge values are algorithmically examined by the computer 90. Any pixel value, or group of pixels values, exceeding a pre-determined value indicates the presence of "hot-spot." The detection of a localized "hot-spot" by the computer 90 results in the generation of a computer command 230 to the gain control unit 240 to reduce the image intensifier gain via a separate control voltage.

Figure 3:
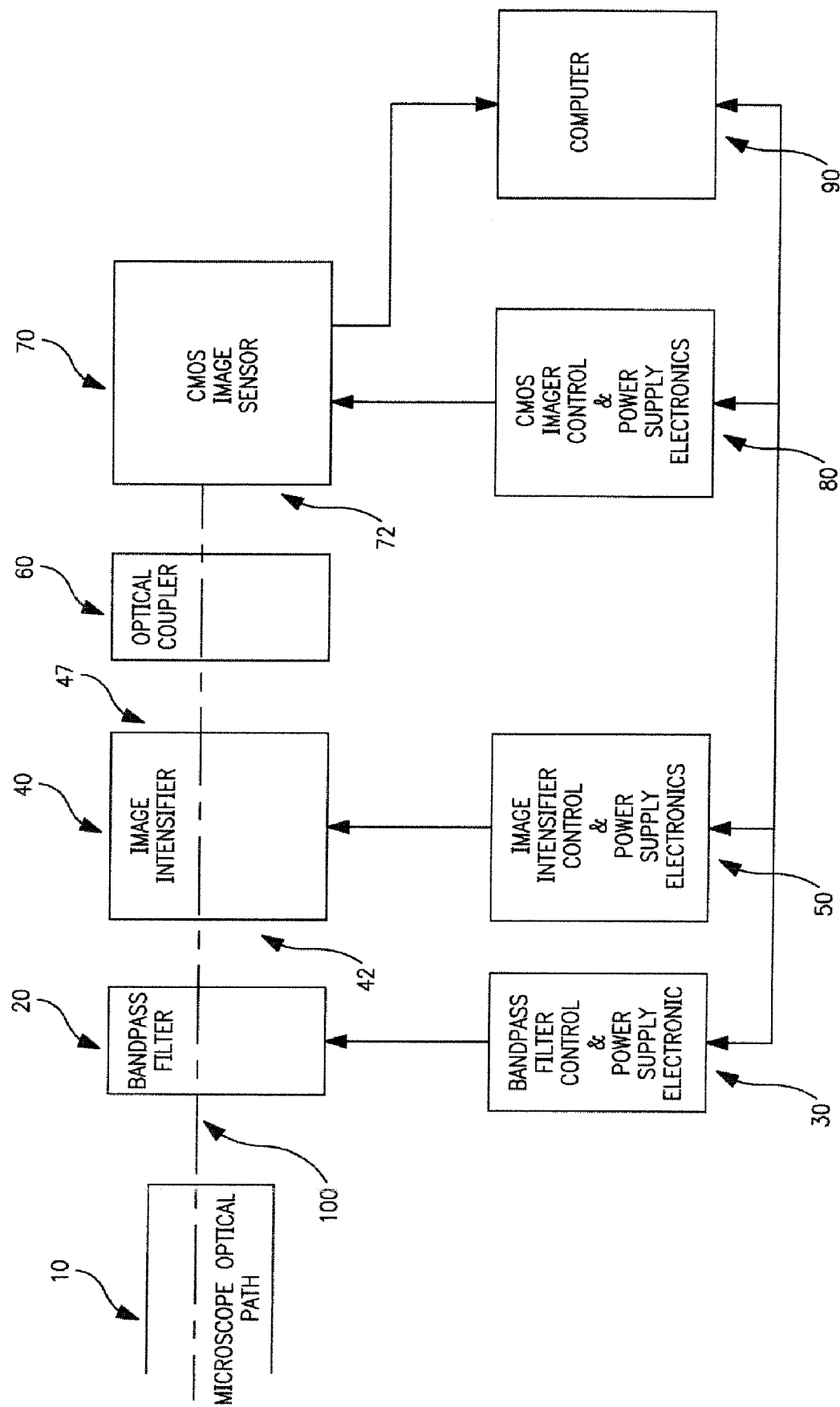
FIG. 3 is a simplified schematic diagram of the biomedical imager system including addition bandpass filtering to provide wavelength discrimination.
Figure 4:
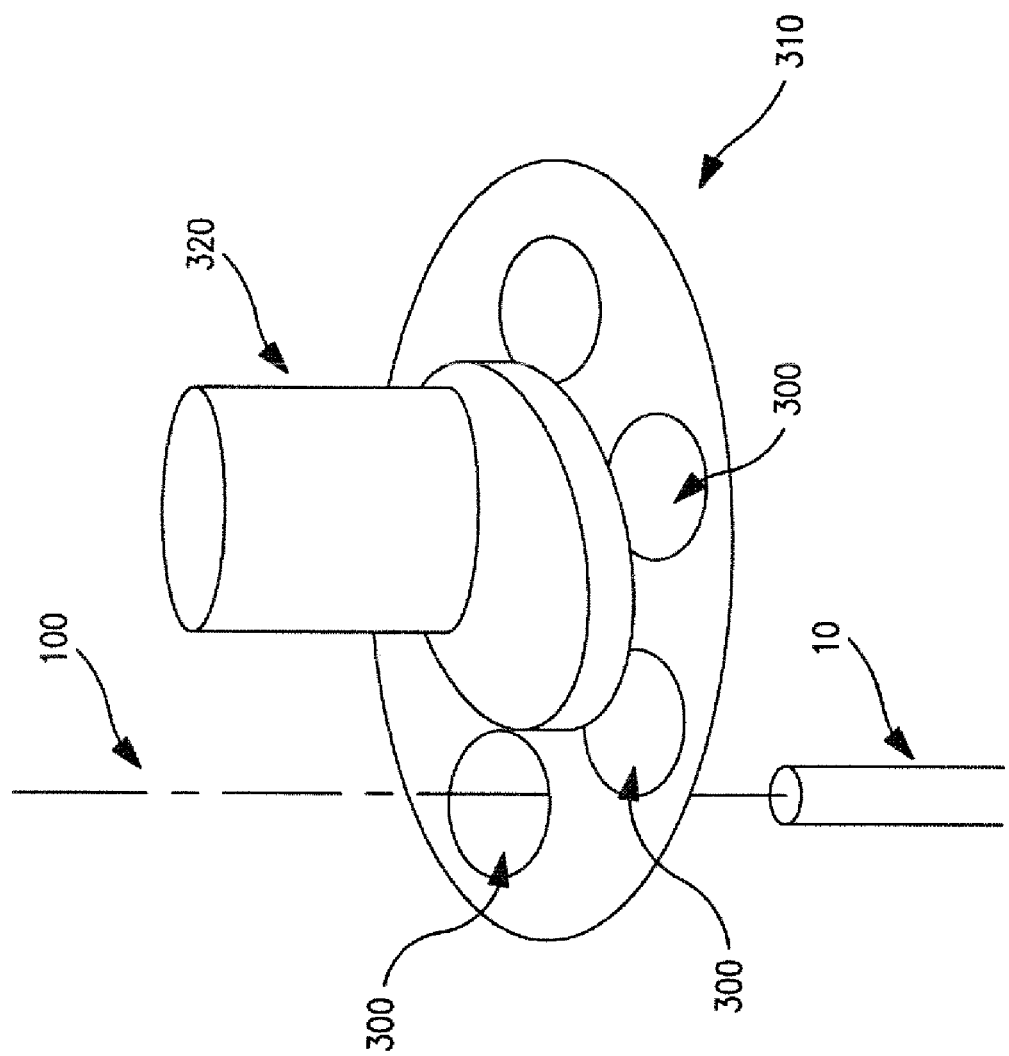
FIG. 4 is a simplified schematic drawing of a automated color wheel.

An embodiment provides for the optional discrimination of image wavelength. As shown in FIG. 3 an optical bandpass filter 20 may be placed in the optical path 100 ahead of the input window 42 of the image intensifier 40. The image entering the image intensifier 40 thus comprises only those image components having wavelengths falling within the filter bandpass. Once the first image is captured, a second optical filter may be placed in the optical path 100, replacing the first bandpass filter. A second image may then be captured. A third filter may subsequently be substituted and a third image may be captured. The three images, thus captured, may be computationally combined in the computer 90. If the three bandpass filters selected have passbands corresponding to primary wavelengths, the combined image may provide full spectrum discrimination. In an embodiment, as schematically shown in FIG. 4, the filters 300 may be placed in an automated color wheel configuration 310. For this configuration, the filters are sequentially arranged so that when the color wheel is spun by a rotary actuator 320, such as a motor, each filter enters and exits the optical path 100. The mechanical position of the filter wheel may be determined and controlled by the bandpass filter control and power supply electronics unit 30 under the control of the computer 90. In a further embodiment, additional filter positions may be allocated for an all-pass filter and an opaque filter. The image obtained with the all-pass filter is a luminance image capturing all wavelengths. For this all-pass configuration, there is no filter attenuation the system exhibits its highest sensitivity. The opaque filter position blocks all light from reaching the system thereby providing the conditions for measuring "dark" current of the CMOS pixels.

Optionally, the computer 90 may generate control signals to be applied to the bandpass filter control and power supply electronics unit 30, the image intensifier control and power supply electronics unit 50, and the CMOS imager control and power supply electronics unit 80.

The computer 90 performs any required analysis of the captured image and outputs the results by means that are well known to those knowledgeable in the art.

STATEMENT REGARDING PREFERRED EMBODIMENTS

While the invention has been described with respect to preferred embodiments, those skilled in the art will readily appreciate that various changes and/or modifications can be made to the invention without departing from the spirit or scope of the invention as defined by the appended claims. All documents cited herein are incorporated by reference herein where appropriate for teachings of additional or alternative details, features and/or technical background.

What is claimed is:

1. An imager system, in a microscope, comprising:
   an image intensifier including an entrance window and an exit window, and comprising a photo-cathode, a dynode, an anode, and a phosphor screen;
   an image intensifier control and power supply unit operationally configured to allow control and powering of said image intensifier and configured to effect overload control of said image intensifier, said image intensifier control and power supply unit operationally connected to said image intensifier;
   a CMOS image sensor having an input window;
   an optical coupler having an input window and an output window, said input window of said optical coupler directly connected to said exit window of said image intensifier, said output window of said optical coupler directly connected to input window of said CMOS image sensor;
   a processor operationally connected to said CMOS image sensor, and operationally configured to interrogate and process data from said CMOS sensor; said processor further connected to said image intensifier control and power supply unit and operatively configured to generate gain control and photo-cathode gating commands said gain control command being generated in response to detection of light intensity hot spots occurring at localized areas within the total image, and said photo-cathode dating command being generated in response to measurement of anode current of said image intensifier; and
   wherein said gain control and said cathode gating commands are applied to said image intensifier control and power supply unit.

2. An imager system of claim 1 wherein said phosphor screen of said image intensifier comprises P-43 phosphor.

3. An imager system of claim 1 where said dynode is a microchannel plate.

4. An imager system of claim 1 further comprising an input optical bandpass filter.

5. An imager system of claim 1 further comprising a plurality of input optical bandpass filters, said plurality of input optical bandpass filters installed on motorized turn table operatively configured to sequentially insert said optical bandpass filters into an optical path; said motorized turn table under the control of said processor.

6. An imager system of claim 5 where one of said input optical filters is all pass.

7. An imager system of claim 5 where one of said input optical filters is opaque.

8. An imager system, in accordance with claim 1, wherein said photo-cathode gating command signal is operationally configured to periodically turn the said photo-cathode on and off, in response to said measurement of anode current.

* * * * *

UNITED STATES PATENT AND TRADEMARK OFFICE
CERTIFICATE OF CORRECTION

PATENT NO. : 7,589,309 B2  Page 1 of 1
APPLICATION NO. : 11/689948
DATED : September 15, 2009
INVENTOR(S) : Triantafyllos P. Tafas It is certified that error appears in the above-identified patent and that said Letters Patent is hereby corrected as shown below:

Column 6,
Claim 1, Line 48, now reads:

-- cathode dating command being generated in response to --

Column 6,
Claim 1, Line 48, should read as follows:

-- cathode gating command being generated in response to --

Signed and Sealed this

Tenth Day of November, 2009

David J. Kappos
*Director of the United States Patent and Trademark Office*